United States Patent
Wang

(10) Patent No.: US 12,264,012 B2
(45) Date of Patent: Apr. 1, 2025

(54) METHOD AND DEVICE FOR DETERMINING WAREHOUSE INVENTORY

(71) Applicant: BEIJING JINDONG ZHENSHI INFORMATION TECHNOLOGY CO., LTD., Beijing (CN)

(72) Inventor: Kebing Wang, Beijing (CN)

(73) Assignee: BEIJING JINDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 667 days.

(21) Appl. No.: 17/623,546

(22) PCT Filed: Mar. 13, 2020

(86) PCT No.: PCT/CN2020/079210
§ 371 (c)(1),
(2) Date: Dec. 28, 2021

(87) PCT Pub. No.: WO2021/008147
PCT Pub. Date: Jan. 21, 2021

(65) Prior Publication Data
US 2022/0258977 A1      Aug. 18, 2022

(30) Foreign Application Priority Data
Jul. 17, 2019   (CN) .......................... 201910646595.0

(51) Int. Cl.
*B65G 1/137*    (2006.01)
*G06Q 10/087*   (2023.01)
*G06Q 10/08*    (2023.01)

(52) U.S. Cl.
CPC ......... *B65G 1/1373* (2013.01); *B65G 1/1371* (2013.01); *G06Q 10/087* (2013.01); *G06Q 10/08* (2013.01)

(58) Field of Classification Search
CPC .. B65G 1/1373; B65G 1/1371; G06Q 10/087; G06Q 10/08
See application file for complete search history.

(56) References Cited

U.S. PATENT DOCUMENTS 10,346,794 B2 *  7/2019  High .................... G06V 20/653
11,142,398 B2 * 10/2021  Lert, Jr. ............... B65G 1/0492
(Continued)

FOREIGN PATENT DOCUMENTS

CN      102867245 A      1/2013
CN      103295116 A      9/2013
(Continued)

OTHER PUBLICATIONS

Chinese Patent Office Action and Written Report for Application 201910646595.0, dated Jul. 28, 2023 (5 pages).
(Continued)

*Primary Examiner* — Kyle O Logan
(74) *Attorney, Agent, or Firm* — Michael Best & Friedrich LLP

(57) ABSTRACT

Disclosed are a method and device for determining a warehouse inventory, which relate to the technical field of computers. One implementation mode of the method comprises: determining, based on a corresponding relationship between virtual storage spaces and containers in a warehouse, the containers located in the virtual storage spaces; acquiring, in accordance with a corresponding relationship between containers, items, and item quantities, the item quantities of the items located in the containers, thereby obtaining a total quantity of the items in the virtual storage spaces; and acquiring the quantities of the items located in physical storage spaces in the warehouse, and updating a total inventory in the warehouse by combining the quantities of the items located in the physical storage spaces with the total quantity of the items in the virtual storage spaces. The (Continued)

implementation mode, with support for physical storage space management, manages a binding relationship between containers on various levels and the virtual storage spaces, which facilitates counting of an inventory during operations; and by unification of counting dimensions in the warehouse, forms a transparent and comprehensive presentation of the state of the warehouse inventory, which increases convenience for recording items and counting item quantities.

16 Claims, 5 Drawing Sheets

(56) References Cited

U.S. PATENT DOCUMENTS

| | | | |
|---|---|---|---|
| 11,235,928 B2* | 2/2022 | Lert, Jr. | ............... B65G 1/1378 |
| 2017/0166399 A1 | 6/2017 | Stubbs et al. | |
| 2018/0025460 A1 | 1/2018 | Watanabe et al. | |

FOREIGN PATENT DOCUMENTS

| | | |
|---|---|---|
| CN | 107392525 A | 11/2017 |
| CN | 107527183 A | 12/2017 |
| CN | 108681858 A | 10/2018 |
| CN | 109325716 A | 2/2019 |
| CN | 109409799 A | 3/2019 |
| JP | H08297705 A | 11/1996 |
| JP | H10218317 A | 8/1998 |
| JP | 2004083233 A | 3/2004 |
| JP | 2010215340 A | 9/2010 |
| WO | 2016173445 A1 | 11/2016 |

OTHER PUBLICATIONS

International Search Report and Written Opinion for Application No. PCT/CN2020/079210 dated Jun. 15, 2020 (13 pages including English translation).

Japanese Patent Office Action for Related Application No. 2021577518 dated Feb. 3, 2023 (9 pages, including an English translation).

* cited by examiner

METHOD AND DEVICE FOR DETERMINING WAREHOUSE INVENTORY

CROSS REFERENCE TO RELATED APPLICATIONS

This is a U.S. national stage entry of International Patent Application No. PCT/CN2020/079210, filed on Mar. 13, 2020, which claims priority to CN Patent Application for Invention No. 201910646595.0, which was filed on Jul. 17, 2019, and the entire contents of each of which is hereby incorporated by reference in its entirety.

TECHNICAL FIELD

The disclosure relates to the field of warehousing logistics, and in particular relates to a method and device for determining a warehouse inventory.

BACKGROUND

An inventory management system is an important part of effective warehouse management. Due to a limited storage capacity of a warehouse, the inventory state of each item in the warehouse will directly affect the turnover rate, the utilization rate and the cost of the whole warehouse, so how to effectively monitor the inventory state of each item in the warehouse is currently of main concerns of businesses.

As found by the inventor during the implementation of the disclosure, the existing art has at least the following problems:

1) The current inventory management system can only clearly present the inventory of the physical warehouse spaces of the warehouse, but the warehouse is a practical operating system based on receiving, pulling and placing, picking and removing, transferring, and so no, and data during warehouse operations (e.g., receiving, picking, and transferring) cannot be tracked and positioned.

2) For the third-party logistics agency operation, when the inventory fee is settled, the storage capacity of the warehouse spaces is calculated. However, in addition to the inventory of the physical warehouse spaces, the actual warehouse inventory also includes the inventory during operations, so the warehouse inventory is always smaller than the book inventory of the operator, which causes reconciliation problems and brings profit losses to the operator.

3) Some services require that receiving and shipping should be managed in dimensions such as the pallet number LPN (License Plate Number) and the circulation box number. However, the current system does not have a nested binding relationship between warehouse spaces, pallets and circulation boxes, so operations in accordance with container levels such as pallet outbound/transferring and circulation box outbound cannot be achieved.

SUMMARY

In view of this, the embodiment of the disclosure provides a method and device for determining a warehouse inventory, which can at least solve the problem that an inventory during operations is not recorded in an existing warehouse.

In order to achieve the aforesaid object, according to one aspect of the embodiment of the disclosure, a method for determining a warehouse inventory is provided, the method comprising:

determining, based on a corresponding relationship between virtual storage spaces and containers in a warehouse, the containers located in the virtual storage spaces, wherein the virtual storage spaces are used for carrying the containers, and the containers are used for carrying items for inbound and outbound operations;

acquiring, in accordance with a corresponding relationship between containers, items, and item quantities, the item quantities of the items located in the containers, thereby obtaining a total quantity of the items in the virtual storage spaces; and acquiring the quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

Optionally, the containers comprise at least one of pallets and circulation boxes; the step for acquiring the item quantities of the items located in the containers, comprises:

acquiring the item quantities of the items located in the pallets if the containers are the pallets; and/or only acquiring the item quantities of the items located in the circulation boxes if the containers include the pallets and the circulation boxes; wherein the pallets are used for carrying the circulation boxes; and/or acquiring the item quantities of the items located in the circulation boxes if the containers are the circulation boxes.

Optionally, the method further comprises: determining, in accordance with an item quality, a frozen quantity, a positioned quantity and a quantity to be moved out of the items in each storage space, an available quantify of the items located in each storage space, thereby updating a total available inventory in the warehouse; wherein the storage spaces include the virtual storage spaces and the physical storage spaces.

Optionally, the virtual storage spaces are at least one of virtual receiving storage spaces, virtual picking storage spaces, and virtual difference storage spaces.

In order to achieve the aforesaid object, according to another aspect of the embodiment of the disclosure, a device for determining a warehouse inventory is provided, the device comprising:

a container determining module for determining, based on a corresponding relationship between virtual storage spaces and containers in a warehouse, the containers located in the virtual storage spaces; wherein the virtual storage spaces are used for carrying the containers, and the containers are used for carrying items for inbound and outbound operations;

an item quantity acquiring module for acquiring, in accordance with a corresponding relationship between containers, items, and item quantities, the item quantities of the items located in the containers, thereby obtaining a total quantity of the items in the virtual storage spaces; and an inventory counting module for acquiring the quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

Optionally, the containers comprise at least one of pallets and circulation boxes; the item quantity acquiring module is used for:

acquiring the item quantities of the items located in the pallets if the containers are the pallets; and/or only acquiring the item quantities of the items located in the circulation boxes if the containers include the pallets and the circulation boxes; wherein the pallets are used for carrying the circulation boxes; and/or acquiring the item quantities of the items located in the circulation boxes if the containers are the circulation boxes.

Optionally, the device further comprises an available inventory counting module for:

determining, in accordance with an item quality, a frozen quantity, a positioned quantity and a quantity to be moved out of the items in each storage space, an available quantify of the items located in each storage space, thereby updating a total available inventory in the warehouse; wherein the storage spaces include the virtual storage spaces and the physical storage spaces.

Optionally, the virtual storage spaces are at least one of virtual receiving storage spaces, virtual picking storage spaces, and virtual difference storage spaces.

In order to achieve the aforesaid object, according to a further aspect of the embodiment of the disclosure, an electronic device for determining a warehouse inventory is provided.

The electronic device according the embodiment of the disclosure comprises: one or more processors; a memory for storing one or more programs, the one or more programs, when executed by the one or more processors, causing the one or more processors to implement any of the aforesaid methods for determining a warehouse inventory.

In order to achieve the aforesaid object, according to a further aspect of the embodiment of the disclosure, a computer-readable medium, on which a computer program is stored, is provided, the program, when executed by a processor, implementing any of the aforesaid methods for determining a warehouse inventory.

According to the solution provided by the disclosure, the aforesaid one embodiment in the disclosure has the following advantages or beneficial effects: with support for physical storage space management, managing a binding relationship between containers on various levels and the virtual storage spaces, which facilitates counting of an inventory during operations; and by unification of counting dimensions in the warehouse, forming a transparent and comprehensive presentation of the state of the warehouse inventory, which increases convenience for recording items and counting item quantities. For complex warehouses, item quantities during operations are generally comparatively large, and the solution provides a basis for businesses to accurately control warehouse inventories and reduce business losses.

Further effects of the aforesaid non-conventional optional manners will be described below in combination with specific implementation modes.

BRIEF DESCRIPTION OF THE DRAWINGS

Figures are used to better understand the disclosure, and do not form improper limitations of the disclosure. Where.

DETAILED DESCRIPTION

The exemplary embodiments of the disclosure, including various details of the embodiments of the disclosure, are described below in combination with the figures to facilitate understanding, and shall be considered to be exemplary ones only. Thus, those skilled in the art should recognize that various changes and modifications may be made to the embodiments described herein without departing from the scope and spirit of the disclosure. Similarly, for clarity and conciseness, descriptions of well-known functions and structures are omitted in the descriptions below.

The words involved in the disclosure are explained as follows:

Warehouse space (storage space) refers to a space where items (i.e., selectable objects, e.g., goods, boxes) are stored. In terms of warehouse management, in order to facilitate the search for items, the storage of items is managed by "four number positioning", i.e., warehouse, shelf, layer, space:

1) "warehouse" refers to the number of the warehouse where the items are stored;

2) "shelf" refers to the number of the warehouse and the number of the shelf where the items are stored;

3) "layer" refers to the number of the shelf and the number of the layer where the items are stored; and 4) "space" refers to the number of the shelf, the number of the layer, and the number of the space where the items are stored.

Figure 1:
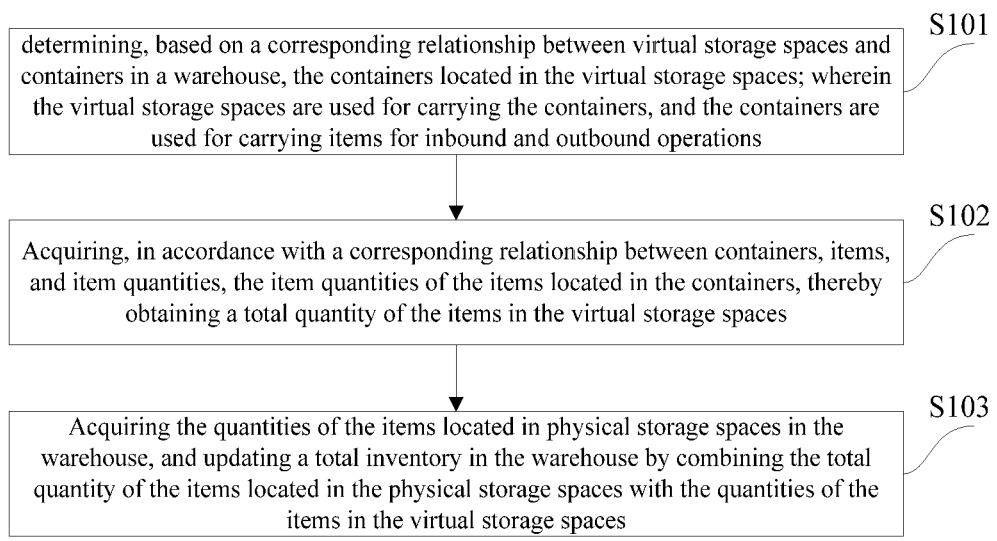
FIG. 1 is a schematic diagram of a main flow of a method for determining a warehouse inventory according to an embodiment of the disclosure.

FIG. 1 shows a main flowchart of a method for determining a warehouse inventory provided by an embodiment of the disclosure, the method comprising the following steps:

S101: determining, based on a corresponding relationship between virtual storage spaces and containers in a warehouse, the containers located in the virtual storage spaces; wherein the virtual storage spaces are used for carrying the containers, and the containers are used for carrying items for inbound and outbound operations;

S102: acquiring, in accordance with a corresponding relationship between containers, items, and item quantities, the item quantities of the items located in the containers, thereby obtaining a total quantity of the items in the virtual storage spaces; and S103: acquiring the quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

The inventory in the warehouse is the sum of all inventories in the inventory table. The disclosure differs from the existing art in that the items in the warehouse are located in the physical storage spaces or the virtual storage spaces (representing the virtual inventory), and all the items during operations are located in the containers (i.e., pallets or circulation boxes) in the virtual storage spaces.

When the pallets (first-level containers) or the circulation boxes (second-level containers) perform operations such as outbound, inbound, and transferring, the system will record, for example, the circulation box number, and the pallet number LPN. The disclosure mainly calculates the quantities of the items in the virtual storage spaces, thereby obtaining the total inventory in the warehouse.

Figure 2:
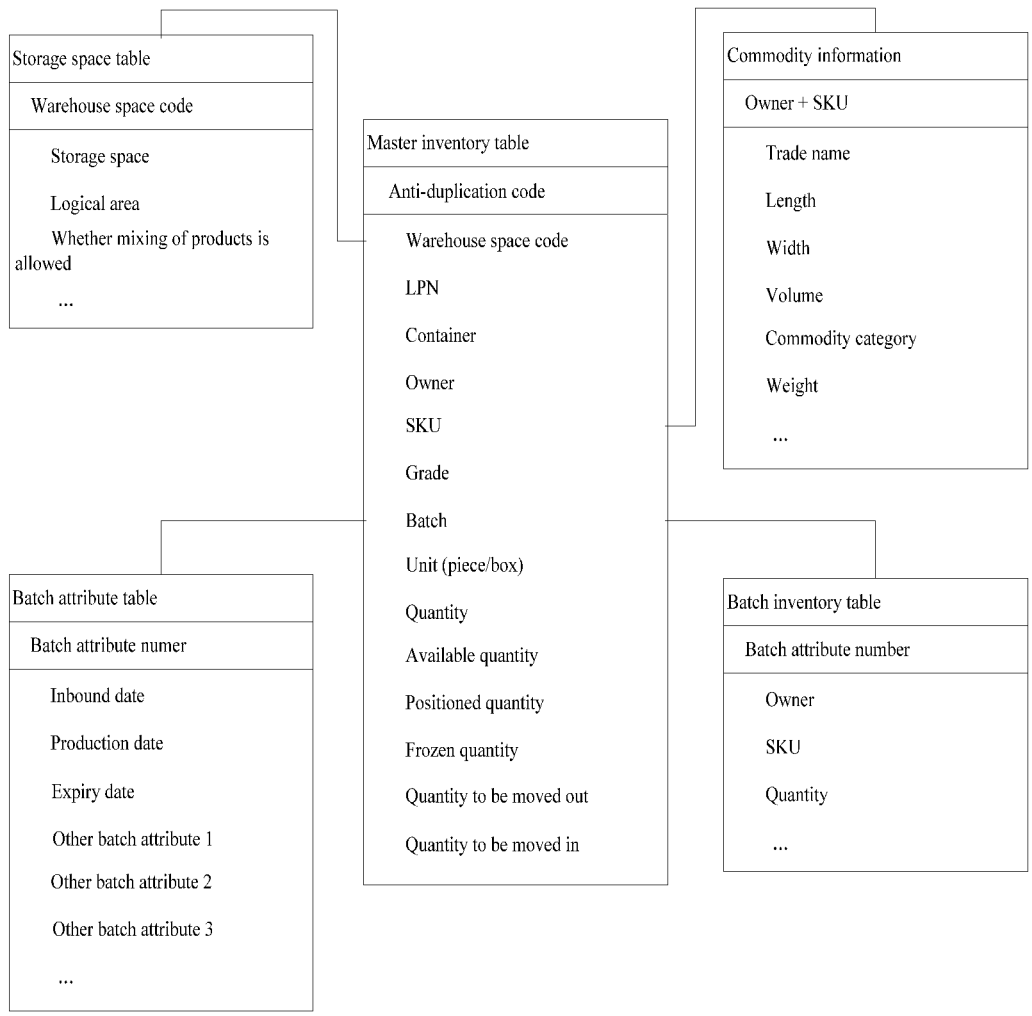
FIG. 2 is a schematic diagram of an inventory model using warehouse spaces, pallets, and circulation boxes as a basic framework according to an embodiment of the disclosure.

In the aforesaid implementation mode, for step S101, an inventory model using warehouse spaces, pallets, and circulation boxes as a basic framework is established from the perspectives of warehouse management of warehouse spaces, pallets, circulation boxes, inventory, and warehouse operations, as shown in FIG. 2.

The inventory model is based on a master inventory table, which mainly stores warehouse spaces, pallets, circulation boxes, SKU (Stock Keeping Unit), grades, batches, and logical quantities associated with service logic, including, total quantity, available quantity, frozen quantity, positioned quantity, quantity to be moved in, and quantity to be moved out.

Around the master inventory table, a batch inventory table and a batch attribute table are also established. The batch inventory table is used to store the quantity of the batch inventory, and forms a mutual proofreading relationship with the master inventory table; the batch attribute table stores detailed expansion items of the warehouse batch, such as the production date, inbound date, expiry date, and other batch attributes associated with the batch number.

It should be noted that the warehouse spaces and the items in the warehouse are both changed in real time, so the master inventory table and the corresponding subsidiary tables are all updated in real time along with the change of the inventory.

Figure 3:
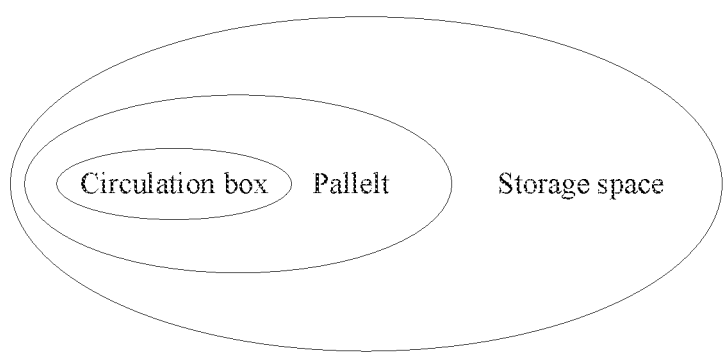
FIG. 3 is a schematic diagram of a two-level nested relationship between warehouse spaces, pallets, and circulation boxes according to an embodiment of the disclosure.

All the inventories in the warehouse are located in the storage spaces, pallets can be placed in the storage spaces, and circulation boxes can be placed in the pallets, forming a two-level nested relationship, as shown in FIG. 3. Batch, grade, SKU, and quantity are specified in the circulation box.

During actual operations, one storage space can be bound to multiple pallets, such as ground stacking spaces; and one pallet can have multiple circulation boxes placed thereon, such as packages, etc.

The disclosure binds storage spaces to pallets and circulation boxes, and divides corresponding storage space locations according to different operation scenarios. There are mainly three virtual storage spaces: virtual receiving storage space INAREA, virtual picking storage space OUTAREA, and virtual difference storage space LOSTAREA (belonging to a virtual storage space for difference processing in the warehouse). The disclosure mainly describes the outbound and inbound operations of the items performed in the three virtual storage spaces.

For step S102, there is a premise for the use of the disclosure that the items in the virtual storage spaces are placed in the circulation boxes or on the pallets. The pallets can carry the circulation boxes, the circulation boxes can also carry out transportations separately, and one pallet and one circulation box only correspond to one storage space.

In the master inventory table, for each virtual storage space, corresponding circulation boxes or pallets are stored, and for each pallet and each circulation box, the identifiers (e.g., serial numbers) of the items and the logical quantity of the items carried thereby are recorded.

See Table 1 as follows:

| | Part of the inventory table for virtual storage spaces | | | | | | |
|---|---|---|---|---|---|---|---|
| Serial number | Storage space | LPN | Circulation box | SKU | Grade | Batch | Quantity |
| 1 | INAREA | * | R0007 | 691200100 | Quality goods | LT002930 | 3 |
| 2 | OUTAREA | * | R004 | 6912002230 | Defective goods | LT003230 | 5 |
| 3 | OUTAREA | * | SO001#001 | 6912002230 | Defective goods | LT003230 | 5 |
| 4 | F010102 | T005 | SO001#002 | 6912002230 | Defective goods | LT003230 | 5 |

For the virtual receiving storage space INAREA, when goods are received in the warehouse, the items are received on the pallets or the circulation boxes; when the returned goods are received, they will be first received in the circulation boxes on the pallets to achieve two-level binding of circulation box-pallet and pallet-storage pace. For case 1, the items 691200100 are received in the INAREA circulation box R0007, and the quantity is 3.

For the virtual picking storage space OUTAREA, when goods are picked in the warehouse, the items are taken out of the storage space and placed in the picking circulation box. For case 2, 5 items 6912002230 are placed in the OUTAREA circulation box R004. For case 3, the items 6912002230 have been rechecked and packaged, and the circulation box number at this time is changed to the package number SO001#001 where the items are located.

For the virtual difference storage space LOSTAREA, the items may be bound with a pallet number after being packaged, and placed in the space of goods to be shipped in the warehouse. For case 4, the items 6912002230 have been rechecked and packaged, the circulation box number is the package number SO001#002, the pallet LPN is T005, and the placement space is F010102. Since the package has not been shipped yet, it still belongs to the inventory in the warehouse when the inventory is counted.

Figure 4:
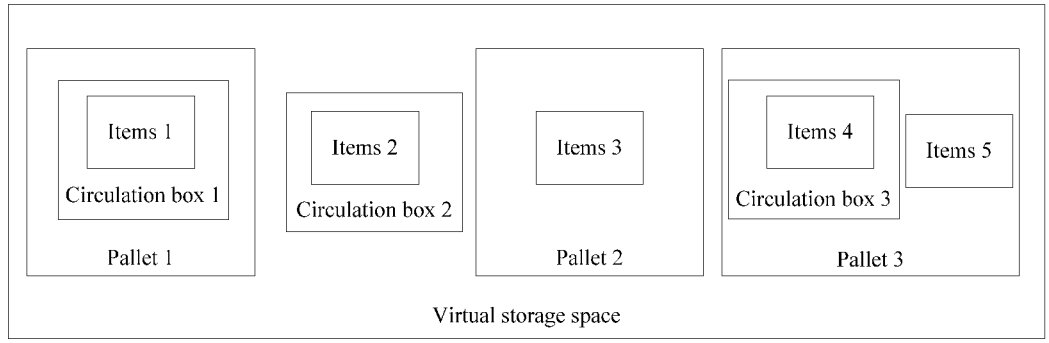
FIG. 4 is a schematic diagram of different states of pallets and circulation boxes stored in virtual storage spaces according to an embodiment of the disclosure.

There may be multiple pallets and multiple circulation boxes in one virtual storage space, and their storage locations are diverse, as shown in FIG. 4:

1) The circulation box 1 is carried on the pallet 1, and the items 1 are placed in the circulation box 1 to achieve two-level nesting. In order to avoid duplication of counting, the items are only counted once when the inventory is calculated, that is, the quantity of the items 1 in the circulation box 1 in the pallet 1.

2) The circulation box 2 is placed directly in the storage space, and only the quantity of the items 2 in the circulation box 2 is counted when the inventory is calculated.

3) The items 3 are placed directly on the pallet 2, and the quantity of the items 3 is just the quantity of the items carried on the pallet 2 when the counting is carried out.

4) There are both the circulation box and the items on the pallet 3, the quantity of the items 4 and the quantity of the items 5 in the circulation box 3 are added to form the total quantity of the items carried on the pallet 3 when the counting is carried out.

In actual operations, the items are generally placed directly on the pallet or in the circulation box, but the circulation box needs the pallet as the carrier for transportation, so the aforesaid methods 1), 2) and 3) are mainly selected.

Thus, when determining the total quantity of the items located in the virtual storage spaces, it is required to accumulate the quantities of all the items in the pallets and the circulation boxes associated therewith. For example, for case 2 and case 3 in Table 1, it can be obtained that there are 5+5=10 items in the virtual picking storage space OUT-AREA.

For step S103, in addition to the inventory of the virtual storage spaces, the total inventory in the warehouse also includes the inventory of the physical storage spaces, that is, the warehouse spaces in a non-operation state, such as shelves.

See Table 2 as follows:

| | Part of the inventory table for physical storage spaces | | | | | | |
|---|---|---|---|---|---|---|---|
| Serial number | Storage space | LPN | Circulation box | SKU | Grade | Batch | Quantity |
| 5 | A010101 | T001 | R0001 | 691200100 | Quality goods | LT002930 | 10 |
| 6 | A010101 | T001 | R0002 | 791200100 | Quality goods | LT002938 | 8 |
| 7 | A010101 | T002 | R0005 | 891200100 | Quality goods | LT002938 | 8 |

Table 2 is directed to the scenario where it is required to record the pallet number LPN and the circulation box number in the warehouse space, and the warehouse space can be set to retain the LPN and the circulation box number. For both full pallet storage and full box storage in practical scenarios such as B2B (Business-to-Business, business-to-business marketing relationship), automated three-dimensional warehouse, robotic warehouse, and other services, it is required to record the circulation box number and the LPN, and bind the records in the system.

The inventory table records the corresponding relationship between warehouse spaces, pallets, circulation boxes, SKUs, grades, batches, logical quantities of items, and so on, by which corresponding relationship the identifiers, such as the item serial numbers, of the items located in the respective physical storage spaces can be determined.

For cases 5 to 7 in Table 2, two pallets numbered T001 and T002 are placed in the storage place A010101:

1) Two circulation boxes numbered R0001 and R0002 are placed on the pallet T001: 10 items 691200100 are stored in circulation box R0001, and 8 items 791200100 are stored in circulation box R0002.

2) One circulation box numbered R0005 is placed on the pallet T002, and 8 items 891200100 are stored in the circulation box.

All the obtained quantities are counted to obtain a total of 10+8+8=26 items in the physical storage space A010101.

During actual operations, item information, pallet information and circulation box information in the physical storage space are all changed in real time, so the table is also updated in real time based on the inventory state of the involved storage space. Specifically, the total quantity of the items that are currently acquired is used in place of the previously recorded total quantity of the items in the storage space to achieve update of data.

See Table 3 as follows:

| | Part of the inventory table for physical storage spaces | | | | | | |
|---|---|---|---|---|---|---|---|
| Serial number | Storage space | LPN | Circulation box | SKU | Grade | Batch | Quantity |
| 8 | A010103 | * | * | 691200110 | Quality goods | LT002240 | 4 |
| 9 | A010104 | * | * | 6912002230 | Defective goods | LT003230 | 5 |

During practical applications, for the use scenario where it is not required to record the pallet number and the circulation box number (nested relationship) for the warehouse space, or the use scenario where items are directly placed in the storage space, the warehouse space can be set to not retain the LPN or the circulation box number, such as the default values "*", "none", "0", etc. and the disclosure takes "*" as an example for descriptions.

For case 8 and case 9 in Table 3, neither the storage space A010103 nor the storage space A010104 retains the LPN or the circulation box number, which corresponds to directly placing the items in the warehouse space to obtain data of the warehouse space.

Thus, for case 8, 4 items 691200110 are placed in the storage space A010103; for case 9, 5 items 6912002230 are placed in the storage space A010104.

All the inventories during operations in the warehouse are located on the LPNs or the circulation boxes in the virtual storage spaces, and all the items in the physical storage spaces can be obtained by the inventory table, so it is only required to sum the quantities of the items in these two types of storage spaces so as to obtain the total inventory in the warehouse as follows:

warehouse inventory=Σ item quantities in virtual storage spaces+Σ item quantities in physical storage spaces The acquired total inventory of the warehouse can provide accurate data for the subsequent reconciliation of the business and reduce business losses; or the business can carry out operations such as goods transfer and relocation according to the value; and operations such as sales promotion and price adjustment can be conducted in a targeted manner.

The method provided in the aforesaid embodiment, with support for storage spaces, manages a binding relationship between containers on various levels and the virtual storage spaces, which facilitates counting of an inventory during operations; by unification of counting dimensions in the warehouse, forms a transparent and comprehensive presentation of the state of the warehouse inventory, which increases convenience for recording items and counting item quantities; and by unification of dimensions in the inventory table, reduces the inventory counting time, perfects the reconciliation logic with users, and obtains the inventory having a comparatively high accuracy.

Figure 5:
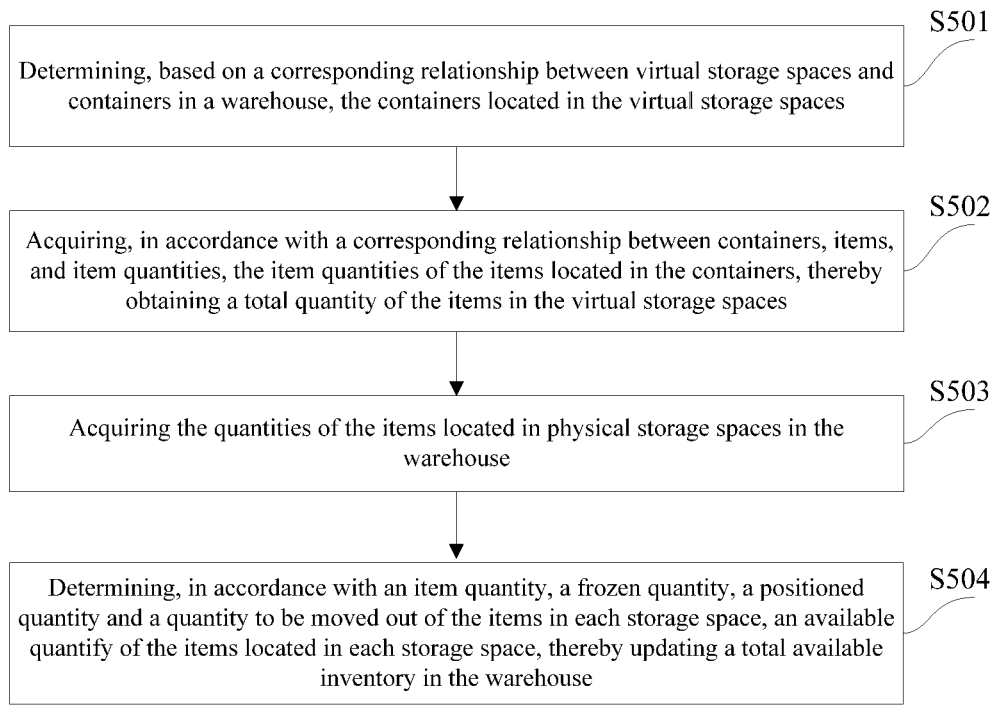
FIG. 5 is a schematic diagram of a flowchart of an optional method for determining a warehouse inventory according to an embodiment of the disclosure.

FIG. 5 shows a schematic diagram of a flowchart of an optional method for determining a warehouse inventory according to an embodiment of the disclosure, the method comprising the following steps:

S501: determining, based on a corresponding relationship between virtual storage spaces and containers in a warehouse, the containers located in the virtual storage spaces; wherein the virtual storage spaces are used for carrying the containers, the containers are used for carrying items for inbound and outbound operations;

S502: acquiring, in accordance with a corresponding relationship between containers, items, and item quantities, the item quantities of the items located in the containers, thereby obtaining a total quantity of the items in the virtual storage spaces;

S503: acquiring the quantities of the items located in physical storage spaces in the warehouse; wherein the physical storage spaces are used for storing the items; and S504: determining, in accordance with an item quantity, a frozen quantity, a positioned quantity and a quantity to be moved out of the items in each storage space, an available quantify of the items located in each storage space, thereby updating a total available inventory in the warehouse.

In the aforesaid implementation mode, for steps S501 to S503, see the descriptions on the steps as shown in FIG. 1.

In the aforesaid implementation mode, for step S504, some items in the storage spaces may be actually unavailable, such as frozen, positioned, to be moved in, and to be moved out, where:

1) frozen quantity: where when there is an abnormal situation in the warehouse, such as an abnormal warehouse space of the inventory, an abnormal item state, etc., the inventory is required to be frozen so as not to be positioned and used by an order, to prevent occupation by an outbound order, and so on; for example, due to a warehouse leak, all items on a certain shelf are unavailable, and it is required to freeze all the items on the shelf;

2) positioned quantity: the quantity pre-occupied by the system when an order enters the warehouse management system, where after the pre-occupation, this quantity of items can be only used for the order, which facilitates subsequent picking;

3) quantity to be moved out: where when an inventory movement occurs in the warehouse space, the system records the inventory through the quantity to be moved out to prevent this quantity of items from being occupied by the order;

4) quantity to be moved in: where the system recommends a new warehouse space for the placement of the moved inventory, and then it is subsequently required to add the quantity to be moved in to the new warehouse space to prevent the circumstance where there is not enough space for other items moved in the inventory of the warehouse space.

The calculation logic for the inventory in the warehouse is as follows:

available quantity of SKU in storage space, LPN, circulation box, grade, batch=total quantity−frozen quantity−positioned quantity−quantity to be moved out.

The specific examples below respectively describe the warehouse storage information from the perspectives of an acceptance operation, placing, picking and removing, transferring, and warehouse storage, see Table 4 as follows:

Inventory table for physical and virtual storage spaces

| Serial number | Storage space | LPN | Circulation box | SKU | Grade | Batch | Quantity | Available quantity | Frozen quantity | Positioned quantity | Quantity to be moved out | Quantity to be moved in |
|---|---|---|---|---|---|---|---|---|---|---|---|---|
| 1 | INAREA | * | R0007 | 691200100 | Quality goods | LT002930 | 3 | 0 | 0 | 0 | 3 | 0 |
| 2 | OUTAREA | * | R004 | 6912002230 | Defective goods | LT003230 | 5 | 5 | 0 | 0 | 0 | 0 |

Inventory table for physical and virtual storage spaces

| Serial number | Storage space | LPN | Circulation box | SKU | Grade | Batch | Quantity | Available quantity | Frozen quantity | Positioned quantity | Quantity to be moved out | Quantity to be moved in |
|---|---|---|---|---|---|---|---|---|---|---|---|---|
| 3 | OUTAREA | * | SO001#001 | 6912002230 | Defective goods | LT003230 | 5 | 5 | 0 | 0 | 0 | 0 |
| 4 | F010102 | T005 | SO001#002 | 6912002230 | Defective goods | LT003230 | 5 | 5 | 0 | 0 | 0 | 0 |
| 5 | A010101 | T001 | R0001 | 691200100 | Quality goods | LT002930 | 10 | 5 | 2 | 3 | 0 | 0 |
| 6 | A010101 | T001 | R0002 | 791200100 | Quality goods | LT002938 | 8 | 3 | 2 | 3 | 0 | 0 |
| 7 | A010101 | T002 | R0005 | 891200100 | Quality goods | LT002938 | 8 | 8 | 0 | 0 | 0 | 0 |
| 8 | A010103 | * | * | 691200110 | Quality goods | LT002240 | 4 | 0 | 0 | 4 | 0 | 0 |
| 9 | A010104 | * | * | 6912002230 | Defective goods | LT003230 | 5 | 0 | 5 | 0 | 0 | 0 |

For case 2, the available quantity 0 of SKU 691200100=quantity 3−positioned quantity 0−frozen quantity 0−quantity to be moved out 3, which is stored in the circulation box R0007 in the virtual receiving storage space INAREA.

For case 2, the available quantity 5 of SKU 6912002230=quantity 5−positioned quantity 0−frozen quantity 0−quantity to be moved out 0, which is stored in the circulation box R004 in the virtual picking storage space OUTAREA, and does not participate in positioning.

For case 3, SKU 6912002230 has been rechecked and packaged, and the circulation box number is the package number SO001#001; the space of goods is still OUTAREA, which does not participate in positioning.

For case 4, SKU 6912002230 has been rechecked and packaged, the circulation box number is the package number SO001#002, the LPN is T005, and it is placed in the space of goods F010102; since the package has not been shipped, when the inventory is counted, this inventory still belongs to the warehouse inventory.

For case 5, the available quantity 5 of SKU 691200100=quantity 10−positioned quantity 3−frozen quantity 2, which is stored in the circulation box R0001 with the LPN of T001 in the storage space A010101.

For case 6, the available quantity 3 of SKU 791200100=quantity 8−positioned quantity 3−frozen quantity 2, which is stored in the circulation box R0002 with the LPN of T001 in the storage space A010101.

For case 7, the available quantity 8 of SKU 891200100=quantity 8−positioned quantity 0−frozen quantity 0, which is stored in the circulation box R0005 with the LPN of R0005 in the storage space A010101.

For case 8, the available number 0 of SKU 691200110=quantity 4−positioned number 4−frozen number 0, which is stored in the storage space A010103.

For case 9, the available number 0 of SKU 6912002230=quantity 5−positioned number 0−frozen number 5, which is stored in the storage space A010104.

Cases 1 to 4 correspond to virtual storage spaces, where the total quantity of the items is 3+5+5+5=18, and the available quantity is 0+5+5+5=15. The virtual picking storage space OUTAREA represents that the items have been picked and have been already in the transportation process, and these items have already been occupied by an order, and thus cannot be occupied by other orders, such as new orders.

Cases 5 to 9 correspond to physical storage spaces, where the total quantity of the items is 10+8+8+4+5=35, and the total available quantity is 5+3+8=16.

Thus, the total quantity of the items in the whole warehouse is 53, and the total available quantity is 15+16=31.

In addition, by considering that all the items in the virtual storage spaces are in an operating state and have been occupied by orders, these items may not be considered when the available inventory of the warehouse is determined. At this time, the total available quantity in the warehouse is as follows:

warehouse available inventory=total inventory−Σ item quantities in virtual storage spaces−Σ unavailable item quantities in physical storage spaces=Σ available item quantities in physical storage spaces.

As shown in Table 4, the available inventory of the warehouse at this time=the total available quantity 16 in cases 5 to 9.

Further, the inventory table is data generated with inventory actions artificially initiated in the warehouse, and the respective storage spaces are subjected to dimension unification by the unified dimensions set in the table, which facilitates subsequent operations such as item quantity counting under various dimensions, as shown in Table 4 above.

In addition to the aforesaid determination of the quantities of the items and the available quantities of the items in the respective storages spaces, counting of the item quantities under dimensions such as the grade, the batch, etc. can be also performed, and the calculation methods thereof are similar to that in the implementation process of the disclosure. For example, the grades of the respective items in the respective storage spaces are determined according to the table, and if the items are quality goods, accumulation is performed.

In addition to the aforesaid presentation form, the inventory table can be also in other forms. For example, the table is divided into two relationships as follows:

1) nested relationship: storage space, first-level container, second-level container, and so no;

2) storage relationship: storage space, lowest-level container (e.g., circulation box, low-level container if there are other lower-level containers), grade, batch, logical quantity, and so no.

When subsequently determining the containers and inquiring about the item quantities, it is required to first determine the containers according to the nested relationship, and then determine the item quantities according to the storage relationship.

Furthermore, for the nested relationship between the storage spaces, the pallets, and the circulation boxes, it can be the binding after an actual operation occurs. For example, after the items are inbound, the items are transmitted by the pallet 1 and the circulation box 1, and then the binding relationship of the virtual inbound storage space INAREA-pallet 1-circulation box 1 and the corresponding relationship with the items 1 during the operations are obtained. Alternatively, the relationship can be preset, and when the items 1 are inbound, they are directly subjected to inbound transmission by the pallet and the circulation box.

As compared with the existing art, the method provided by the embodiment of the disclosure has the following beneficial effects.

1) All the items in the operating state in the warehouse are in the circulation boxes or on the pallets, and the pallets and the circulation boxes are bound to the storage spaces to achieve a two-level nested relationship, which perfects the inventory management of the items in the existing warehouse.

2) Based on the nested relationship of the containers, the items are only counted once when the inventory is counted to avoid duplication of calculation, which improves the accuracy of the counting of the item quantities.

3) By unification of counting dimensions in the warehouse, a transparent and comprehensive presentation of the state of the warehouse inventory is formed, which increases convenience for recording items, reduces the inventory counting time, saves calculation resources, and perfects the reconciliation logic with users.

4) The system directly counts all the inventories in the storage spaces in the warehouse from the inventory table when counting the inventory in the warehouse, and the obtained inventory has a comparatively high accuracy, so that users can freely settle accounts anytime and anywhere, which reduces warehouse losses.

Figure 6:
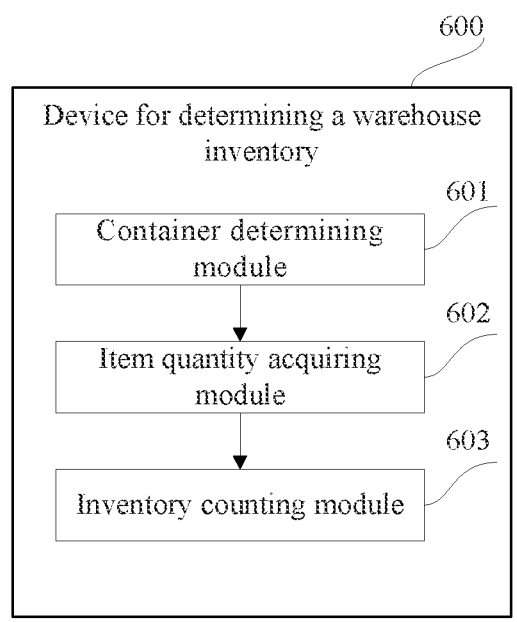
FIG. 6 is a schematic diagram of main modules of a device for determining a warehouse inventory according to an embodiment of the disclosure.

FIG. 6 shows a schematic diagram of main modules of a device 600 for determining a warehouse inventory provided by an embodiment of the disclosure, the device comprising:

a container determining module 601 for determining, based on a corresponding relationship between virtual storage spaces and containers in a warehouse, the containers located in the virtual storage spaces; wherein the virtual storage spaces are used for carrying the containers, and the containers are used for carrying items for inbound and outbound operations;

an item quantity acquiring module 602 for acquiring, in accordance with a corresponding relationship between containers, items, and item quantities, the item quantities of the items located in the containers, thereby obtaining a total quantity of the items in the virtual storage spaces; and an inventory counting module 603 for acquiring the quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

In the device implemented in the disclosure, the containers are at least one of pallets and circulation boxes;

the item quantity acquiring module 602 is used for:

acquiring the item quantities of the items located in the pallets if the containers are the pallets; and/or only acquiring the item quantities of the items located in the circulation boxes if the containers include the pallets and the circulation boxes; wherein the pallets are used for carrying the circulation boxes; and/or acquiring the item quantities of the items located in the circulation boxes if the containers are the circulation boxes.

The device implemented in the disclosure further comprises an available quantity counting module 604 (not shown in the figure) for:

determining, in accordance with an item quantity, a frozen quantity, a positioned quantity and a quantity to be moved out of the items in each storage space, an available quantify of the items located in each storage space, thereby updating a total available inventory in the warehouse; wherein the storage spaces include the virtual storage spaces and the physical storage spaces.

In the device implemented in the disclosure, the virtual storage spaces are at least one of virtual receiving storage spaces, virtual picking storage spaces, and virtual difference storage spaces.

In addition, the specific implementation contents of the device in the embodiment of the disclosure have been described in detail in the method above, so no descriptions on the repeated contents are further given herein.

Figure 7:
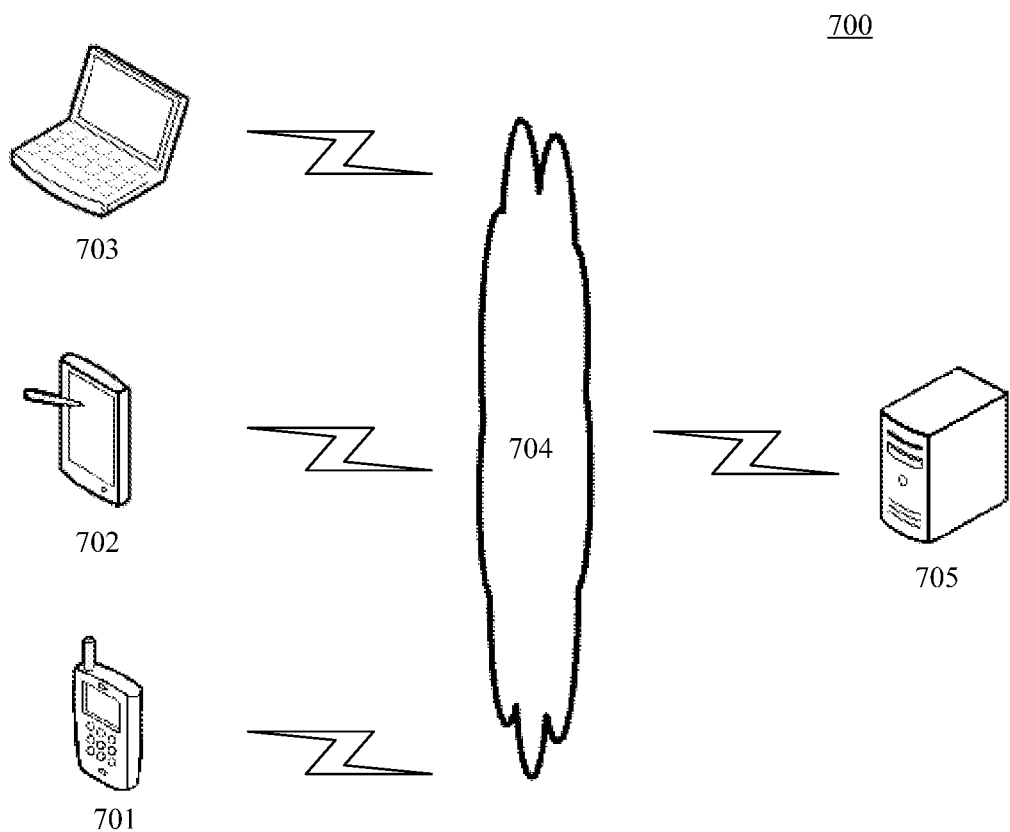
FIG. 7 is an exemplary diagram of a system architecture to which an embodiment of the disclosure can be applied.

FIG. 7 shows an exemplary system architecture 700 to which an embodiment of the disclosure can be applied.

As shown in FIG. 7, the system architecture 700 may comprise terminal devices 701, 702, 703, a network 704, and a server 705 (only examples). The network 704 is a medium for providing a communication link between the terminal devices 701, 702, 703 and the server 705. The network 704 may include various connection types, such as wired or wireless communication links, or fiber-optic cables.

The user may use the terminal devices 701, 702, 703 to interact with the server 705 through the network 704 to receive or send messages and so on. Various communication client applications, such as shopping applications, web browser applications, search applications, instant messaging tools, email clients, social platform software, and so on (only examples), may be installed on the terminal devices 701, 702, 703.

The terminal devices 701, 702, 703 may be various electronic devices having screens and supporting web browsing, including but not limited to smart phones, tablet computers, laptop portable computers, desktop computers, and so on.

The server 705 may be a server that provides various services, such as a background management server that provides support for shopping websites browsed by the user using the terminal devices 701, 702, 703 (only an example). The background management server may process, for example, analyze the received request for querying product information and other data, and feed the processing results (such as target push information and product information-only examples) back to the terminal devices.

It shall be noted that the method for determining a warehouse inventory provided by the embodiments of the disclosure is generally performed by the server 705, and correspondingly, the device for determining a warehouse inventory is generally provided in the server 705.

It should be understood that the numbers of the terminal devices, the networks, and the servers in FIG. 7 are merely schematic. According to implementation requirements, there may be any numbers of terminal devices, networks, and servers.

Figure 8:
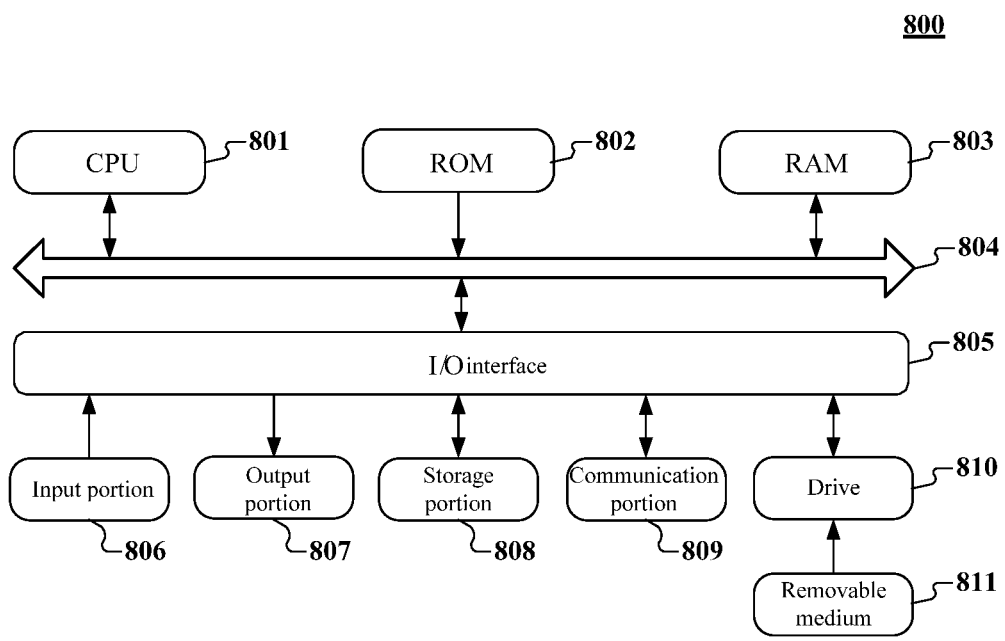
FIG. 8 is a schematic diagram of a structure of a computer system suitable for implementing a mobile device or a server according to an embodiment of the disclosure.

Reference is now made to FIG. 8, which shows a schematic diagram of a structure of a computer system 800 suitable for implementing a terminal device according to an embodiment of the disclosure. The terminal device shown in FIG. 8 is only an example, and shall not impose any limitation on the functions and the scope of use of the embodiment of the disclosure.

As shown in FIG. 8, the computer system 800 includes a central processing unit (CPU) 801, which may perform various appropriate actions and processes according to a program stored in a read-only memory (ROM) 802 or a program loaded from a storage portion 808 into a random access memory (RAM) 803. Various programs and data required for the operation of the system 800 are also stored in the RAM 803. The CPU 801, the ROM 802 and the RAM 803 are connected to each other through a bus 804. An input/output (I/O) interface 805 is also connected to the bus 804.

The following components are connected to the I/O interface 805; an input portion 806 including a keyboard, a mouse, and so on; an output portion 807 including a cathode ray tube (CRT), a liquid crystal display (LCD) and so on, and a speaker and so on; a storage portion 808 including a hard disk and so on; and a communication portion 809 including a network interface card such as a LAN card, a modem, and so on. The communication portion 809 performs communication processing via a network such as the Internet. A drive 810 is also connected to the I/O interface 805 according to requirements. A removable medium 811, such as a magnetic disk, an optical disk, a magneto-optical disk, a semiconductor memory, and so on, is installed on the drive 810 according to requirements so that a computer program read therefrom is installed in the storage portion 808 according to requirements.

In particular, according to the embodiment disclosed in the disclosure, the process described above with reference to the flowchart may be implemented as a computer software program. For example, the embodiment of the disclosure includes a computer program product, which includes a computer program carried on a computer-readable medium, the computer program containing a program code for performing the method shown in the flowchart. In such embodiment, the computer program may be downloaded and installed from the network through the communication portion 809, and/or installed from the removable medium 811. When the computer program is executed by the central processing unit (CPU) 801, the above functions defined in the system according to the disclosure are executed.

It shall be noted that the computer-readable medium shown in the disclosure may be a computer-readable signal medium or a computer-readable storage medium or any combination of the above two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium may be any tangible medium containing or storing a program, and the program may be used by or in combination with an instruction execution system, apparatus or device. In the disclosure, the computer-readable signal medium may include a data signal propagated in a baseband or propagated as a part of a carrier wave, in which a computer-readable program code is carried. Such propagated data signal may adopt many forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program for use by or in connection with the instruction execution system, apparatus or device. The program code contained on the computer-readable medium may be transmitted using any appropriate medium, including but not limited to wireless, wire, optical cable, RF, and so on, or any suitable combination thereof.

The flowcharts and block diagrams in the figures illustrate architectures, functions and operations that may be implemented by systems, methods and computer program products according to various embodiments of the disclosure. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules described in the embodiment of the disclosure may be implemented by software or hardware. The described modules may be also provided in a processor. For example, a description may be made as follows: a container determining module, an item quantity acquiring module, and an inventory counting module. The names of these modules do not form limitations of the modules themselves in some cases. For example, the inventory counting module can be also described as a "module for counting a total inventory of a warehouse".

As another aspect, the disclosure also provides a computer-readable medium, which may be included in the devices described in the above embodiment, or may exist independently without being assembled into the devices. The above computer-readable medium carries one or more programs, and the one or more programs, when executed by one of the devices, cause the device to include:

determining, based on a corresponding relationship between virtual storage spaces and containers in a warehouse, the containers located in the virtual storage spaces; wherein the virtual storage spaces are used for carrying the containers, and the containers are used for carrying items for inbound and outbound operations;

acquiring, in accordance with a corresponding relationship between containers, items, and item quantities, the item quantities of the items located in the containers, thereby obtaining a total quantity of the items in the virtual storage spaces; and acquiring the quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

As compared with the prior art, the technical solution of the embodiment of the disclosure has the following beneficial effects:

1) All the items in the operating state in the warehouse are in the circulation boxes or on the pallets, and the pallets and the circulation boxes are bound to the storage spaces to achieve a two-level nested relationship, which perfects the inventory management of the items in the existing warehouse.

2) Based on the nested relationship of the containers, the items are only counted once when the inventory is counted to avoid duplication of calculation, which improves the accuracy of the counting of the item quantities.

3) By unification of counting dimensions in the warehouse, a transparent and comprehensive presentation of the state of the warehouse inventory is formed, which increases convenience for recording items, reduces the inventory counting time, saves calculation resources, and perfects the reconciliation logic with users.

4) The system directly counts all the inventories in the storage spaces in the warehouse from the inventory table when counting the inventory in the warehouse, and the obtained inventory has a comparatively high accuracy, so that users can freely settle accounts anytime and anywhere, which reduces warehouse losses.

The above specific implementation modes do not form limitations on the scope of protection of the disclosure. It shall be understood by those skilled in the art that various modifications, combinations, sub-combinations and substitutions may occur depending on design requirements and other factors. Any modification, equivalent replacement, improvement, and so on made within the spirit and principle of the disclosure shall be included in the scope of protection of the disclosure.

The invention claimed is:

1. A method for determining a warehouse inventory, comprising:
    establishing in real time, with at least one processor via an inventory table, a corresponding relationship between virtual storage spaces and containers in a warehouse, wherein the corresponding relationship includes a one-to-one corresponding relationship between the virtual storage spaces and one container and a nested relationship between the virtual storage spaces and multiple containers, the virtual storage spaces storing items during warehouse operations;
    determining, with the at least one processor based on the corresponding relationship, the containers located in the virtual storage spaces, wherein the virtual storage spaces are used for carrying the containers, and the containers are used for carrying items for inbound and outbound operations;
    acquiring, with the at least one processor in accordance with a corresponding relationship between containers, items, and item quantities, the item quantities of the items located in the containers, and obtaining a total quantity of the items in the virtual storage spaces; and
    acquiring, with the at least one processor, quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

2. The method as to claim 1, wherein the containers comprise at least one selected from a group consisting of pallets and circulation boxes; and wherein
    acquiring, with the at least one processor, the item quantities of the items located in the containers, comprises at least one selected from group consisting of:
        acquiring, with the at least one processor, the item quantities of the items located in the pallets when the containers are the pallets;
        only acquiring, with the at least one processor, the item quantities of the items located in the circulation boxes when the containers include the pallets and the circulation boxes; wherein the pallets are used for carrying the circulation boxes; and
        acquiring, with the at least one processor, the item quantities of the items located in the circulation boxes when the containers are the circulation boxes.

3. The method as to claim 2, wherein the virtual storage spaces are at least one selected from a group consisting of virtual receiving storage spaces, virtual picking storage spaces, and virtual difference storage spaces.

4. The method as to claim 1, further comprising:
    determining, with the at least one processor in accordance with an item quantity, a frozen quantity, a positioned quantity and a quantity to be moved out of the items in each storage space, an available quantity of the items located in each storage space, and updating a total available inventory in the warehouse; wherein the storage spaces include the virtual storage spaces and the physical storage spaces.

5. The method as to claim 4, wherein the virtual storage spaces are at least one selected from a group consisting of virtual receiving storage spaces, virtual picking storage spaces, and virtual difference storage spaces.

6. The method as to claim 1, wherein the virtual storage spaces are at least one selected from a group consisting of virtual receiving storage spaces, virtual picking storage spaces, and virtual difference storage spaces.

7. The method of claim 1, further comprising using the total inventory in the warehouse to perform at least one selected from a group consisting of a goods transfer and a goods relocation.

8. The method of claim 1, further comprising using the total inventory in the warehouse to perform at least one selected from a group consisting of a sales promotion and a price adjustment.

9. A device for determining a warehouse inventory, the device comprising at least one processor, the at least one processor is configured to:
    establish in real time, via an inventory table, a corresponding relationship between virtual storage spaces and containers in a warehouse, wherein the corresponding relationship includes a one-to-one corresponding relationship between the virtual storage spaces and one container and a nested relationship between the virtual storage spaces and multiple containers, the virtual storage spaces storing items during warehouse operations;
    determine, based on the corresponding relationship, the containers located in the virtual storage spaces, wherein the virtual storage spaces are used for carrying the containers, and the containers are used for carrying items for inbound and outbound operations;
    acquire, in accordance with a corresponding relationship between containers, items, and item quantities, the item quantities of the items located in the containers, and obtain a total quantity of the items in the virtual storage spaces; and acquire quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

10. The device as to claim 9, wherein the containers comprise at least one of pallets and circulation boxes and wherein the at least one processor is configured to acquire;

the item quantities of the items by at least one selected from a group consisting of:

acquiring the item quantities of the items located in the pallets when the containers are the pallets;

only acquiring the item quantities of the items located in the circulation boxes when the containers include the pallets and the circulation boxes; wherein the pallets are used for carrying the circulation boxes; and acquiring the item quantities of the items located in the circulation boxes when the containers are the circulation boxes.

11. The device as to claim 10, wherein the virtual storage spaces are at least one selected from a group consisting of virtual receiving storage spaces, virtual picking storage spaces, and virtual difference storage spaces.

12. The device as to claim 9, wherein the at least one processor is further configured to:

determine, in accordance with an item quantity, a frozen quantity, a positioned quantity and a quantity to be moved out of the items in each storage space, an available quantity of the items located in each storage space, and update a total available inventory in the warehouse, wherein the storage spaces include the virtual storage spaces and the physical storage spaces.

13. The device as to claim 12, wherein the virtual storage spaces are at least one selected from a group consisting of virtual receiving storage spaces, virtual picking storage spaces, and virtual difference storage spaces.

14. The device as to claim 9, wherein the virtual storage spaces are at least one selected from a group consisting of virtual receiving storage spaces, virtual picking storage spaces, and virtual difference storage spaces.

15. An electronic device, comprising:

one or more processors;

a memory for storing one or more programs, the one or more processors configured to, through execution of the one or more programs, to:

establish in real time, via an inventory table, a corresponding relationship between virtual storage spaces and containers in a warehouse, wherein the corresponding relationship includes a one-to-one corresponding relationship between the virtual storage spaces and one container and a nested relationship between the virtual storage spaces and multiple containers, the virtual storage spaces storing items during warehouse operations;

determine, based on the corresponding relationship, the containers located in the virtual storage spaces, wherein the virtual storage spaces are used for carrying the containers, and the containers are used for carrying items for inbound and outbound operations;

acquire, in accordance with a corresponding relationship between containers, items, and item quantities, the item quantities of the items located in the containers, and obtain a total quantity of the items in the virtual storage spaces; and acquire quantities of the items located in physical storage spaces in the warehouse, and updating a total inventory in the warehouse by combining the quantities of the items located in the physical storage spaces with the total quantity of the items in the virtual storage spaces; wherein the physical storage spaces are used for storing the items.

16. A non-transitory computer-readable medium, on which a computer program is stored, wherein the program, when executed by a processor, implements the method according to claim 1.

* * * * *